US012798219B2

(12) United States Patent
Gomer et al.

(10) Patent No.: US 12,798,219 B2
(45) Date of Patent: Nov. 17, 2026

(54) LAMINATED PANE, HEATABLE IN REGIONS, FOR PROJECTION ARRANGEMENT

(71) Applicant: SAINT-GOBAIN GLASS FRANCE, Courbevoie (FR)

(72) Inventors: Andreas Gomer, Kerpen (DE); Valentin Schulz, Niederzier (DE); Bernd Boschke, Heinsberg (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 512 days.

(21) Appl. No.: 18/546,743

(22) PCT Filed: Apr. 26, 2022

(86) PCT No.: PCT/EP2022/060948
§ 371 (c)(1),
(2) Date: Aug. 16, 2023

(87) PCT Pub. No.: WO2022/238101
PCT Pub. Date: Nov. 17, 2022

(65) Prior Publication Data

US 2024/0157680 A1 May 16, 2024

(30) Foreign Application Priority Data

May 12, 2021 (EP) .................................... 21173544

(51) Int. Cl.
*B32B 17/10* (2006.01)
*G02B 27/01* (2006.01)
*H05B 3/20* (2006.01)

(52) U.S. Cl.
CPC .. *B32B 17/10385* (2013.01); *B32B 17/10036* (2013.01); *B32B 17/10229* (2013.01);
(Continued)

(58) Field of Classification Search
CPC ......... G02B 27/01–2027/0198; H04N 5/7491; B32B 17/10385
(Continued)

(56) References Cited

U.S. PATENT DOCUMENTS

2004/0135742 A1 7/2004 Weber et al.
2009/0257141 A1* 10/2009 Yamada ................ C03C 17/001 359/893
(Continued)

FOREIGN PATENT DOCUMENTS

CN 101592780 A 12/2009
CN 107045203 A * 8/2017 ......... G02B 27/0101
(Continued)

OTHER PUBLICATIONS

International Search Report as issued in International Patent Application No. PCT/EP2022/060948, dated Jun. 29, 2022.
(Continued)

*Primary Examiner* — Jessica M Merlin
(74) *Attorney, Agent, or Firm* — CUSHMAN PARTNERS LLC

(57) ABSTRACT

A laminated pane includes an outer and inner panes and a thermoplastic intermediate layer arranged between the outer and inner panes, wherein the outer and inner panes each have an outer and an inner side, and the inner side of the outer pane and the outer side of the inner pane face one another, and the thermoplastic intermediate layer contains at least one masking layer, and the masking layer is opaque at least in one region, a heating element which is arranged within the opaque region of the masking layer, and a reflective layer adapted to reflect visible light, wherein the reflective layer is arranged spatially in front of the at least one masking layer in the viewing direction from the inner
(Continued)

Figure 1:
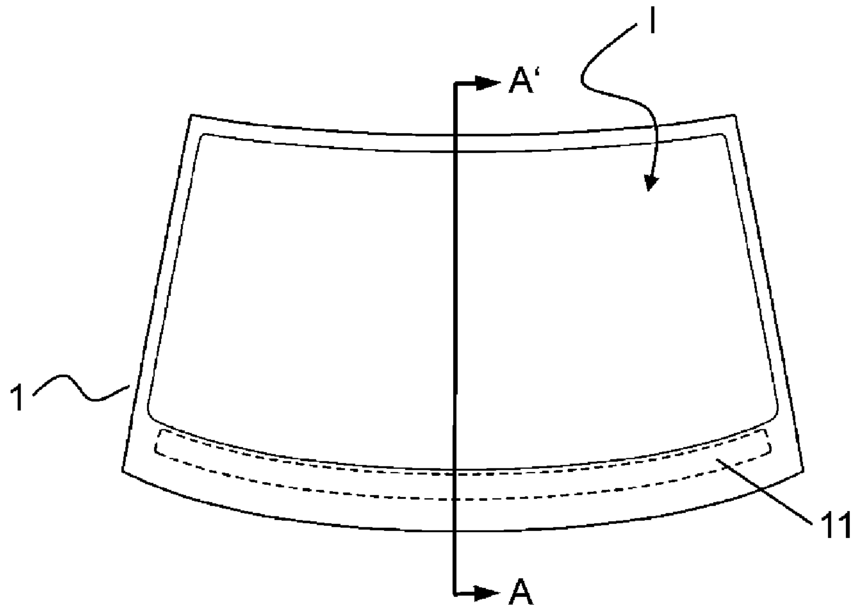

pane to the outer pane and overlaps at least partially with the opaque region of the masking layer.

20 Claims, 7 Drawing Sheets

(52) U.S. Cl.
CPC .... *B32B 17/10348* (2013.01); *B32B 17/1066* (2013.01); *B32B 17/10761* (2013.01); *B32B 17/10935* (2013.01); *G02B 27/0101* (2013.01); *H05B 3/20* (2013.01); *B32B 2457/20* (2013.01); *B32B 2605/00* (2013.01); *G02B 2027/0194* (2013.01)

(58) Field of Classification Search
USPC ...... 359/13–14, 629–633; 345/7–9; 348/115; 349/11
See application file for complete search history.

(56) References Cited

U.S. PATENT DOCUMENTS

| | | | | |
|---|---|---|---|---|
| 2009/0295681 | A1 | 12/2009 | Kaminski et al. | |
| 2016/0134013 | A1 * | 5/2016 | Suenaga .............. | H01Q 1/1271 343/711 |
| 2021/0018749 | A1 | 1/2021 | Fischer et al. | |

FOREIGN PATENT DOCUMENTS

| | | | | |
|---|---|---|---|---|
| CN | 107787275 | A | 3/2018 | |
| CN | 110549993 | A | * 12/2019 | ............... H05B 3/86 |
| CN | 111164492 | A | 5/2020 | |
| CN | 111587232 | A | 8/2020 | |
| CN | 112533883 | A | 3/2021 | |
| DE | 42 42 797 | A1 | 7/1993 | |
| DE | 103 52 464 | A1 | 6/2005 | |
| DE | 10 2009 020824 | A1 | 2/2010 | |
| DE | 10 2014 220189 | A1 | 4/2016 | |
| FR | 3095435 | A1 | 10/2020 | |
| JP | H05-055120 | U | 7/1993 | |
| KR | 1020200044802 | A | 4/2020 | |
| WO | WO 96/19347 | A2 | 6/1996 | |
| WO | WO 2021/209201 | A1 | 10/2021 | |
| WO | WO 2022/073860 | A1 | 4/2022 | |
| WO | WO 2022/073894 | A1 | 4/2022 | |
| WO | WO 2022/161894 | A1 | 8/2022 | |
| WO | WO 2022/179817 | A1 | 9/2022 | |
| WO | WO 2022/214369 | A1 | 10/2022 | |
| WO | WO 2022/218699 | A1 | 10/2022 | |
| WO | WO 2022/228946 | A1 | 11/2022 | |
| WO | WO 2023/052065 | A1 | 4/2023 | |

OTHER PUBLICATIONS

Notice of Allowance as issued in Korean Patent Application No. 10-2023-7039049, dated Apr. 16, 2026.
Office Action as issued in Chinese Patent Application No. 202280002120.8, dated Dec. 5, 2025.

* cited by examiner

LAMINATED PANE, HEATABLE IN REGIONS, FOR PROJECTION ARRANGEMENT

CROSS-REFERENCE TO RELATED APPLICATIONS

This application is the U.S. National Stage of PCT/EP2022/060948, filed Apr. 26, 2022, which in turn claims priority to European patent application number 21173544.4 filed May 12, 2021. The content of these applications are incorporated herein by reference in their entireties.

The invention relates to a laminated pane, heatable in regions, for a projection arrangement, to a method for the production thereof, to the use thereof, and to a projection arrangement.

Head-up displays are nowadays frequently used in vehicles and aircraft. A head-up display functions by using an imaging unit, which, by means of an optics module and a projection surface, projects an image perceived by the driver as a virtual image. If this image is reflected, for example, via the vehicle windshield used as a projection surface, important information can be presented to the user which significantly improves traffic safety.

Vehicle windshields usually consist of two glass panes which are laminated to one another via at least one thermoplastic film. The problem with head-up displays that are typically used is that the projector image is reflected on both surfaces of the windshield. As a result, the driver perceives not only the desired primary image that is produced by the reflection on the interior-side surface of the windshield (primary reflection). The driver also perceives a slightly offset secondary image that is generally less intense and is produced by the reflection on the outer surface of the windshield (secondary reflection). This problem is commonly solved by arranging the reflective surfaces at a specifically selected angle to one another, so that the primary image and the secondary image are superimposed, as a result of which the secondary image no longer has a disruptive effect.

Typically, the radiation of the head-up display projector is substantially s-polarized due to the better reflection characteristics of the windshield compared to p-polarization. However, if the driver wears polarization-selective sunglasses which transmit only p-polarized light, he can barely perceive the HUD image or not perceive it at all. There is therefore a need for HUD projection arrangements which are compatible with polarization-selective sunglasses. A solution to the problem in this connection is therefore the use of projection arrangements which use p-polarized light.

Another problem is the perceptibility of the information transmitted by the reflected image regardless of weather conditions and lighting conditions. It must be possible for crucial and safety-relevant information to be sufficiently perceived by the driver at any time day or night and also in case of strong sunshine or rain. When designing a display which is based upon the head-up display technology, the projector must therefore have a correspondingly strong power, so that the projected image has sufficient brightness—in particular, when sunlight is incident—and can be easily seen by the viewer. This requires a certain size of the projector and is associated with a corresponding power consumption.

DE 102014220189A1 discloses a head-up display projection arrangement which is operated with p-polarized radiation in order to generate a head-up display image. Since the angle of incidence typically lies close to Brewster angle, and p-polarized radiation is therefore reflected only to a small degree by the glass surfaces, the windshield has a reflective structure which can reflect p-polarized radiation towards the driver. Proposed as a reflective structure is a single metallic layer having a thickness of 5 nm to 9 nm, e.g., made of silver or aluminum, which is applied to the outer side of the inner pane facing away from the interior of the passenger vehicle.

US 2004/0135742A1 also discloses a head-up display projection arrangement which is operated with p-polarized radiation in order to produce a head-up display image and has a reflective structure which can reflect p-polarized radiation towards the driver. The multilayer polymer layers disclosed in WO 96/19347A3 are proposed as a reflective structure.

When designing a display which is based upon the head-up display technology, it must also be ensured that the projector have a correspondingly strong power, so that the projected image has sufficient brightness—in particular, when sunlight is incident—and can be easily seen by the viewer. This requires a certain size of the projector and is associated with a corresponding power consumption and heat emission.

It is possible to produce a display also in the masking region basically according to the same principle as a HUD. Thus, the masking region is also irradiated by a projector and reflected there, thereby generating a display for the driver. Thus, for example, information which has been previously displayed in the region of the dashboard, such as the time, travel speed, engine speed, or information of a navigation system, or also the image of a rearward-directed camera, which replaces the conventional exterior mirrors or rearview mirrors, can be displayed directly on the windshield in a practical and aesthetically appealing manner—for example, in the section of the masking region which borders the lower edge of the windshield. A projection arrangement of this type is known, for example, from DE 102009020824A1.

A further great challenge during driving is heating the windshield in order to prevent icing or fogging of the pane, which obstructs vision. In particular, water frequently condenses in the region close to the lower edge of the windshield inside the vehicle, which is the result of moisture entering the vehicle. The pane is usually heated by heated air, which is blown onto the pane via inlets. This type of heating is referred to for short as the HVAC (heating, ventilation, and air conditioning) method. In addition to the enormous energy consumption, the inlets, via which the hot air is transported and blown onto the pane, require a large amount of space. Furthermore, the outlet nozzles must be attached in a certain geometric relation to the pane, which in turn significantly restricts freedom of design and construction.

Alternatively, the pane itself can have an electrical heating function. DE 10352464A1, for example, discloses a laminated glass pane in which electrically heatable wires are inserted between two glass panes. The specific heating power can be set by the ohmic resistance of the wires. Due to design and safety aspects, the number and the diameter of the wires must be kept as small as possible. In daylight and at night under headlights, the wires must not be visible at all or be visible only to a very minor extent.

The object of the present invention is therefore to provide an improved laminated pane for projection arrangements based upon HUD technology.

The object of the present invention is achieved according to the invention by a laminated pane according to claim 1. Preferred embodiments result from the dependent claims.

According to the invention, a laminated pane is described which is provided in particular for a projection arrangement. The laminated pane comprises at least:

an outer pane, an inner pane, and a thermoplastic intermediate layer arranged between the outer pane and the inner pane, a heating element, and a reflective layer.

The outer pane and the inner pane each have an outer side and an inner side, and the inner side of the outer pane and the outer side of the inner pane face one another. The reflective layer is suitable for reflecting visible light. The thermoplastic intermediate layer comprises or consists of at least one masking layer which is opaque at least in one region. The heating element is arranged within the opaque region of the masking layer. The reflective layer is arranged spatially in front of the masking layer in the viewing direction from the inner pane to the outer pane and overlaps at least partially with the opaque region of the masking layer.

"The reflective layer is suitable for reflecting visible light" means that the reflective layer can reflect visible light to a certain extent and is intended to reflect visible light of an image display device. The reflective layer preferably reflects at least 1% of the visible light impinging upon it.

The reflective layer can be arranged on the inner side or the outer side of the inner pane. The reflective layer can have sections which do not overlap with the opaque region of the masking layer. The expression, "viewing direction from the inner pane to the outer pane," in the sense of the invention means the viewing direction in the orthogonal direction from the plane of the inner pane to the outer pane.

The laminated pane is provided for separating an interior from an external environment. The inner side of the inner pane faces the interior, and the outer side of the outer pane faces the external environment.

The reflective layer overlaps in regions or completely with the opaque region of the masking layer. This results in a good image presentation with high contrast to the opaque region of the masking layer, so that it appears bright and is thus also easy to perceive. This advantageously enables a reduction in the power of an image display device, which is provided for emitting an imaging light onto the reflective layer. This leads to reduced energy consumption and reduced heat generation. The arrangement of the heating element in the opaque region of the masking layer can be used for heating the laminated pane, whereby the condensation (condensed water on the inner pane or the outer pane) in the opaque region in general and in the opaque region which overlaps with the reflective layer can be reduced. As a result, the space in the dashboard region can be significantly reduced when the laminated pane is installed as a vehicle pane in a vehicle. This allows for a leaner design in the vehicle interior. With the image presentation via the reflective layer in front of the opaque region, the display, usually attached to the dashboard, with speedometer, tachometer, warning indicator, and fuel gauge can be replaced. Heating of the laminated pane by the heating element replaces supply lines, which usually conduct air heated by engine heat to the windshield. If a current flows through the heating element, the latter is heated as a result of its electrical resistance and by means of Joule heat generation. Moreover, additional geometric degrees of freedom arise when designing the vehicle interior if the air outlet nozzles, which are usually mounted in a specific geometric relationship to the glazing, are omitted. Furthermore, heating of the laminated pane via electrical energy is more energy-efficient than heating by engine-heated air. The laminated pane according to the invention can be produced easily and cost-effectively using known production methods.

Various preferred layer sequences of the laminated pane according to the invention are described below:

Outer pane—masking layer—reflective layer—inner pane

Outer pane—masking layer—inner pane—reflective layer

The laminated pane is provided for separating an interior from an external environment. The inner side of the inner pane faces the interior, and the outer side of the outer pane faces the external environment. In the context of the invention, the phrase, "the reflective layer is arranged spatially in front of the masking layer in the viewing direction from the inner pane to the outer pane," means that the reflective layer is closer to the interior than the masking layer. The reflective layer is therefore arranged in front of the masking layer when looking through the laminated pane from inside the vehicle. The laminated pane preferably has two opposite side edges and an upper edge and a lower edge. The upper edge is intended to be arranged in the upper region in the installed position, while the opposite lower edge is intended to be arranged in the lower region in the installed position. The total surface of the laminated pane results from the calculation of the surface area by means of the side edges, the upper edge, and the lower edge. The size of the total surface of the laminated pane is identical to the outer sides and the inner sides of the inner pane and the outer pane.

In the context of the present invention, "transparent" means that the total transmission of the laminated pane complies with the legal provisions for windshields (for example, with European Union directives, ECE-R43) and preferably has a permeability to visible light (according to ISO 9050:2003) of more than 30% and in particular of more than 60%—for example, more than 70%. Accordingly, "opaque" means a light transmittance of less than 15%, preferably less than 10%, particularly preferably less than 5%, and in particular 0%.

In a further preferred embodiment of the invention, the masking layer moreover has a transparent region, and the opaque region preferably extends over less than 30%, particularly preferably over less than 20%, and in particular over less than 10%, of the total surface of the laminated pane. In this case, the masking layer is designed as at least one thermoplastic composite film which has transparent regions in some areas and opaque regions in others. The proportion of the transparent regions is advantageously greater than the opaque regions if the laminated pane is to be used as a viewing pane—for example, as a vehicle pane.

Alternatively, the thermoplastic intermediate layer can contain at least the masking layer and at least one transparent layer. Moreover, the masking layer is preferably completely opaque. The masking layer preferably extends over less than 30%, particularly preferably over less than 20%, and in particular over less than 10%, of the total surface of the laminated pane. The thermoplastic intermediate layer can also be formed by several masking layers and transparent layers. As a result, several composite films with different properties can be used during the production of the laminated pane. It is, moreover, technically easier to produce a completely colored composite film than a laminated pane that is colored only in regions. The masking layer and the transparent layer are formed as thermoplastic composite films. During production of the laminated panes according to the invention, the thermoplastic composite films may overlap slightly for manufacturing reasons. Preferably, the transparent layer and the masking layer overlap by 1 cm or less.

The masking layer and/or the transparent layer contain or consist of at least one thermoplastic polymer—preferably polyvinyl butyral (PVB), ethylene vinyl acetate (EVA), and/or polyurethane (PU) or copolymers or derivatives thereof—optionally in combination with polyethylene terephthalate (PET). However, the masking layer and/or the transparent layer can also contain, for example, polypropylene (PP), polyacrylate, polyethylene (PE), polycarbonate (PC), polymethyl methacrylate, polyvinyl chloride, polyacetate resin, casting resin, acrylate, fluorinated ethylene propylene, polyvinyl fluoride, and/or ethylene tetrafluoroethylene, or a copolymer or mixture thereof.

The masking layer and/or the transparent layer are preferably designed as at least one thermoplastic composite film and contain or consist of polyvinyl butyral (PVB)—particularly preferably of polyvinyl butyral (PVB)—and additives known to the person skilled in the art—for example, plasticizers. The masking layer and/or the transparent layer preferably contain at least one plasticizer.

The masking layer and/or the transparent layer can be formed by a single composite film or also by more than one composite film. The masking layer and/or the transparent layer can be formed by one or more thermoplastic composite films arranged one above the other, wherein the thickness of the thermoplastic intermediate layer is preferably from 0.25 mm to 1 mm, and typically 0.38 mm or 0.76 mm.

The masking layer and/or the transparent layer can also be a functional thermoplastic intermediate layer—in particular, an intermediate layer with acoustically damping properties, an intermediate layer reflecting infrared radiation, an intermediate layer absorbing infrared radiation, and/or an intermediate layer absorbing UV (ultraviolet) radiation. Thus, the transparent layer can, for example, also be a band filter film that blocks out narrow bands of visible light.

The masking layer has at least one opaque region or is completely opaque. The opaque region is preferably designed to be opaque by means of coloring or pigmentation, and preferably black pigmentation. The coloring or pigmentation of the opaque region of the masking layer can be freely selected, but is preferably black.

In a further preferred embodiment of the laminated pane according to the invention, the masking layer is arranged to be at least adjacent to the lower edge of the laminated pane and preferably extends over at least 5% and particularly preferably over at least 10% of the total surface of the laminated pane. In this example, the masking layer is preferably completely opaque. The masking layer is preferably arranged along the lower edge and adjacent to the lower edge. This results in a rectangular opaque strip, which is arranged along the lower edge, when looking onto the laminated pane. If the laminated pane is used, for example, as a windshield in a vehicle, this arrangement enables a projection arrangement with a high-contrast image in the region of the masking layer. As a result of the masking layer being arranged along the lower edge, the see-through region of the laminated pane remains transparent.

In a particularly preferred embodiment of the invention, the opaque region of the masking layer is arranged in a frame-like, circumferential manner in an edge region of the laminated pane and—in particular, in a section which is in overlap with the reflective layer—has a greater width than in sections different therefrom. The masking layer may be completely opaque. In this case, the transparent layer is preferably arranged within the opaque frame formed by the masking layer. Alternatively, the region of the masking layer within the opaque frame is preferably transparent. In the context of the present invention, the phrase, "has a greater width," means that the opaque region in this section perpendicular to the extension has a greater width than in other sections. In this way, the opaque region can be suitably adapted to the dimensions of the reflective layer.

The reflective layer and the opaque region preferably each have a surface which is arranged congruently. Alternatively, the opaque region has a larger surface than the reflective layer, and the reflective layer overlaps completely with the opaque region. It is thus possible to obtain a full-range, high-contrast image when the light is reflected.

In the context of the invention, the description that, for example, an element A overlaps completely with an element B means that the orthonormal projection from element A to the plane from element B is arranged completely within element B.

In a further particular embodiment of the invention, the reflective layer extends with at least 50%, preferably at least 70%, and particularly preferably at least 80%, over the total surface of the laminated pane. The reflective layer is arranged, in particular, to be congruent with the total surface of the laminated pane. This has the advantage that a large region of the laminated pane is suitable for reflecting images. It is possible to provide several projection arrangements which each generate a reflected image in different regions of the laminated pane. If the laminated pane is used as a windshield, a head-up display region could thus be used in the see-through region of the windshield. At the same time, a high-contrast, reflected image can be generated with the masking layer in the overlap region, which can also be perceived visually by the user.

The reflective layer is preferably partially light-permeable, which in the context of the invention means that it has an average transmission (according to ISO 9050:2003) in the visible spectral range of preferably at least 60%, particularly preferably at least 70%, and in particular less than 85%, and thereby does not significantly limit the view through the pane. The reflective layer preferably reflects at least 15%, particularly preferably at least 20%, and very particularly preferably at least 30%, of the light impinging upon the reflective layer. The reflective layer preferably reflects only p-polarized or s-polarized light. The reflective layer is intended to reflect a light of an image display device. The light reflected by the reflective layer is preferably visible light, i.e., light in a wavelength range of approximately 380 nm to 780 nm. The reflective layer preferably has a high and uniform reflectance (over different angles of incidence) to p-polarized and/or s-polarized radiation, so that a strong and color-neutral image presentation is ensured. The reflectance describes the proportion of the total emitted radiation (of the light) that is reflected. It is indicated in % (based upon 100%-emitted radiation) or as a unitless number from 0 to 1 (normalized to the emitted radiation). It forms the reflection spectrum when plotted as a function of the wavelength. The information on the reflection of light relates to a reflection measurement with a light source A which radiates in the spectral range of 380 nm to 780 nm with a standardized radiation intensity of 100%. The proportion of the radiation reflected by the reflective layer is measured, e.g., with a photo-light spectrometer (for example, from Perkin Elmer), and set in relation to the radiation intensity of light source A.

The reflective layer may also be opaque. The reflective layer is preferably opaque if arranged to be congruent with the opaque region of the masking layer, or if the reflective layer overlaps completely with the opaque region of the masking layer. The opaque reflective layer preferably reflects at least 60%, particularly preferably at least 70%, and very particularly preferably at least 80% of the light impinging upon the reflective layer.

The laminated pane according to the invention can additionally comprise a first masking strip, made in particular of a dark, and preferably black, enamel. The first masking strip is in particular a peripheral, i.e., frame-like, cover print. The peripheral, first masking strip primarily serves as UV protection for the construction adhesive of the laminated pane. The first masking strip can be opaque and designed to cover the entire surface. The first masking strip can also be designed to be semi-transparent, at least in sections—for example, as a dot matrix, stripe matrix, or checkered matrix. Alternatively, the first masking strip can also have a gradient—for example, from an opaque coverage to a semi-transparent coverage. Suitable methods for producing a cover print and the different variants of cover prints are known to the person skilled in the art.

In addition to the first masking strip, further masking strips can be present, which can be made of the same materials and have the same structure as the first masking strip, irrespective of the design of the first masking strip.

In a particularly preferred embodiment of the invention, the first masking strip is applied in regions on the inner side and/or the outer side—preferably the inner side—of the outer pane, wherein the heating element completely overlaps with the first masking strip. In other words, the heating element is completely covered by the first masking strip when viewed through the laminated pane in the viewing direction from the outer pane to the inner pane. In addition, the opaque masking layer or the opaque region of the masking layer can overlap completely or in regions with the first masking strip. As a result of this arrangement, the heating element is not visible from an outside environment, i.e., from the environment facing the outer surface of the outer pane. This improves the aesthetic properties of the laminated pane.

The indication of the polarization direction refers to the plane of incidence of the radiation on the laminated pane. P-polarized radiation refers to a radiation the electric field of which oscillates in the plane of incidence. P-polarized radiation refers to a radiation the electric field of which oscillates perpendicular to the plane of incidence. The plane of incidence is spanned by the incident vector and the surface normal of the laminated pane in the geometric center of the irradiated region.

In other words, the polarization, i.e., in particular, the proportion of p- and s-polarized radiation, is determined at a point of the region irradiated by the image display device—preferably in the geometric center of the irradiated region. Since laminated panes can be curved (for example, when configured as a windshield), which has effects upon the plane of incidence of the image display device radiation, polarization components slightly deviating therefrom can occur in the other regions, which is unavoidable for physical reasons.

The reflective layer preferably comprises at least one metal selected from a group consisting of aluminum, tin, titanium, zirconium, hafnium, vanadium, niobium, tantalum, chromium, manganese, iron, cobalt, rhodium, iridium, nickel, palladium, platinum, copper, silver, gold, or mixture alloys thereof. The reflective layer can also comprise silicon in combination with the above-mentioned metals or independently thereof. Silicon can be deposited very well as a coating on glass or films by means of sputtering processes, which simplifies the production of the reflective layer.

In a particularly preferred embodiment of the invention, the reflective layer is a coating containing a thin-film stack, i.e., a layer sequence of thin individual layers. This thin-film stack contains one or more electrically-conductive layers based upon silver. The electrically-conductive layer based upon silver provides the reflection coating with the basic reflective properties, and also with an IR-reflecting effect and with electrical conductivity. The electrically-conductive layer is formed on the basis of silver. The conductive layer preferably contains at least 90 wt % silver, particularly preferably at least 99 wt % silver, and very particularly preferably at least 99.9 wt % silver. The silver layer can have doping—for example, palladium, gold, copper, or aluminum. Silver-based materials are particularly suitable for reflecting light, and particularly preferably p-polarized light. The use of silver in reflective layers has proven to be particularly advantageous in the reflection of light. The coating has a thickness of 5 μm to 50 μm, and preferably of 8 μm to 25 μm.

If something is formed "on the basis of" a material, it consists predominantly of this material, and in particular substantially of this material, in addition to any impurities or doping.

The reflective layer can also be designed as a reflectively coated or uncoated film which reflects light, and preferably p-polarized light. The reflective layer can be a carrier film with a reflective coating or an uncoated, reflective polymer film. The reflective coating preferably comprises at least one layer based upon a metal and/or a dielectric layer sequence with alternating refractive indices. The layer based upon a metal preferably contains silver and/or aluminum, or consists thereof. The dielectric layers can be formed, for example, on the basis of silicon nitride, zinc oxide, tin-zinc oxide, silicon-metal mixed nitrides such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or hyperstoichiometrically. They can have doping—for example, aluminum, zirconium, titanium, or boron. The reflective, uncoated polymer film preferably comprises or consists of dielectric polymer layers. The dielectric polymer layers preferably contain PET. If the reflective layer is designed as a reflective film, it is preferably from 30 μm to 300 μm, particularly preferably from 50 μm to 200 μm, and in particular from 100 μm to 150 μm, thick.

If the reflective layer is designed as a coating, it is preferably applied to the inner pane by physical vapor deposition (PVD), particularly preferably by cathode sputtering, and very particularly preferably by magnetic-field-assisted cathode sputtering ("magnetron sputtering"). In principle, however, the coating can also be applied, for example, by means of chemical vapor deposition (CVD), plasma-enhanced chemical vapor deposition (PECVD), by vapor deposition, or by atomic layer deposition (ALD). The coating is preferably applied to the panes in front of the lamination.

In a particular embodiment of the invention, the reflective layer is arranged on the outer side of the inner pane, and, in addition, a further reflective layer is arranged on the inner side of the inner pane. The reflective layer and the further reflective layer are arranged to be congruent in the viewing direction from the inner pane to the outer pane. The further reflective layer can consist of the same materials, independently of the reflective layer, and can have the same structure as the reflective layer. By coating the outer side and the inner side of the inner pane, the total reflection of light impinging upon the reflective layers can be improved.

If the film is a coated reflective film, the CVD or PVD coating methods (vapor deposition or atomization methods) can also be applied for production.

In a particularly preferred embodiment of the invention, the reflective layer is a reflective film which is metal-free and reflects visible light beams preferably with a p-polarization. The reflective layer is a film which functions on the basis of prisms which act on the basis of synergistically-interacting prisms and reflective polarizers. Such films for the use of reflective layers are commercially available—for example, from the 3M company.

In a further preferred embodiment of the invention, the reflective layer is a holographic optical element (HOE). The expression, HOE, means elements which are based upon the functional principle of holography. HOE's change light in the beam path by means of the information usually stored in the hologram as a change in the refractive index. Their function is based upon the superimposition of various planar or spherical light waves, the interference pattern of which brings about the desired optical effect. HOE's are already used in the transportation field, for example, in head-up displays. The advantage of using an HOE compared to simple reflective layers results from a greater geometric freedom of design with regard to the arrangement of eye and projector position and the respective inclination angles, e.g., of projector and reflective layer. Furthermore, in this variant, double images are reduced particularly strongly or even prevented. HOE's are suitable for the representation of real images or even of virtual images at different image distances. In addition, the geometric angle of the reflection can be set with the HOE so that, for example, when used in a vehicle, the information transmitted to the driver can be displayed very well from the desired viewing angle.

In a preferred embodiment of the invention, the reflective layer is designed as a coated or uncoated reflective film which is arranged between the opaque region of the masking layer and the transparent layer. The opaque region of the masking layer and the transparent layer overlap in regions where the reflective layer is arranged. The transparent layer and the opaque region are formed to be thinner in the region of the overlap in order to prevent thickness differences in the laminated pane. The layer sequence is designed as follows in the region of the reflective layer:

Outer pane—opaque region of the masking layer—reflective layer—transparent layer—inner pane In a further preferred embodiment, the laminated pane also comprises a first busbar and a second busbar, which are provided for connection to a voltage source. The first and the second busbars are connected to an edge region of the heating element in such a way that a current path through the heating element for a heating current is formed between the busbars. The first and the second busbars are preferably applied on the outer side of the inner pane or on the inner side of the outer pane. Particularly preferably, the busbars are arranged in an edge region of the laminated pane. The heating element and the first and the second busbars can be electrically connected to one another via wires. The wires preferably contain or consist of copper and/or tungsten.

The busbars can be covered by the opaque region of the masking layer, the first and/or the second masking strips towards the inner pane, and/or towards the outer pane.

The first and the second busbars can be designed as imprinted and burnt-in conductive structures. The imprinted busbars preferably contain at least one metal, a metal alloy, a metal compound, and/or carbon—particularly preferably a noble metal, and in particular silver. The printing paste preferably contains metallic particles, metal particles, and/or carbon, and in particular noble metal particles such as silver particles. The electrical conductivity is preferably achieved by the electrically-conductive particles. The particles can be in an organic and/or inorganic matrix such as pastes or inks, and preferably as a printing paste with glass frits. Such busbars are known per se to those skilled in the art.

The first and the second busbars can be connected to a voltage source via connection lines. The connection lines are preferably flat conductors (foil conductors, flat strip conductors), which are formed on the basis of tin-plated copper, aluminum, silver, gold, or alloys thereof.

The first and the second busbars are preferably connected to a voltage source which provides an on-board voltage customary for motor vehicles—preferably of 12 V to 15 V, and in particular about 14 V. Alternatively, the voltage source can also have higher voltages—preferably of 16 V to 450 V, and in particular of 40 to 100 V.

The heating element can extend over the entire opaque region or be arranged only in regions within the opaque region. In the context of the invention, the phrase, "within the opaque region," of the masking layer means that the heating element is completely enclosed by the opaque region of the masking layer, i.e., is in spatial contact with the opaque region of the masking layer from all spatial directions. Preferably, the arrangement within the opaque region is achieved by arranging and laminating the heating element between at least two thermoplastic composite films that are opaque at least in regions. Alternatively, the heating element can be embedded in at least one, locally opaque, thermoplastic composite film by pressure and heat—preferably during the lamination process—to form the laminated pane according to the invention. The heating element can extend beyond the opaque region over the total surface of the laminated pane.

In the context of the present invention, composite films can be individual films or multi-layer films which serve to connect adjacent films, layers, panes, or the like.

In a particularly preferred embodiment of the invention, the heating element is embedded completely within the opaque region of the masking layer. Preferably, the heating element also extends over the entire surface of the opaque region. The heating element can thus be used for heating the entire opaque region and the adjacent regions.

In a preferred embodiment of the invention, the heating element is arranged in the region where the reflective layer and the opaque region overlap. The heating element is thus arranged behind the reflective layer when looking through the laminated pane (from the inner pane), so that the reflective layer completely covers the heating element. Alternatively, the reflective layer can also cover the heating element only in regions. This arrangement is particularly suitable for cases in which the reflective layer is arranged, for example, in the vicinity of the pane root, i.e., in the lower edge of the laminated pane in the installed position. This is because—particularly in this region—condensed water tends to condense on the inner side of the inner pane.

The heating element can be designed as an electrically-conductive coating which is applied to a carrier film. The carrier film is preferably formed on the basis of plastic, and particularly preferably on the basis of polyethylene terephthalate.

The electrically-conductive coating typically contains one or more, e.g., two, three, or four, electrically-conductive, functional layers. The functional layers preferably contain at least one metal—for example, silver, gold, copper, nickel, and/or chromium, or a metal alloy. The functional layers particularly preferably contain at least 90 wt % of the metal, and in particular at least 99.9 wt % of the metal. The functional layers can consist of the metal or the metal alloy. The functional layers particularly preferably contain silver or a silver-containing alloy. Such functional layers have particularly advantageous electrical conductivity and, at the same time, high transmission in the visible spectral range. The thickness of a functional layer is preferably from 5 nm to 50 nm, and particularly preferably from 8 nm to 25 nm. In this thickness region of the functional layer, an advantageously high transmission in the visible spectral range and a particularly advantageous electrical conductivity are achieved.

Preferably, at least one dielectric layer is arranged in each case between two adjacent functional layers of the coating. Preferably, a further dielectric layer is arranged below the first and/or above the last functional layer. A dielectric layer contains at least one individual layer made of a dielectric material—for example, containing a nitride such as silicon nitride or an oxide such as aluminum oxide. Dielectric layers can, however, also comprise multiple individual layers, e.g., individual layers of a dielectric material, smoothing layers, matching layers, blocker layers, and/or anti-reflective layers. The thickness of a dielectric layer is, for example, from 10 nm to 200 nm.

This layer structure is generally obtained by a sequence of deposition processes which are carried out by a vacuum method, such as magnetic-field-assisted cathode sputtering on the carrier film.

Further suitable electrically-conductive coatings preferably contain indium-tin oxide (ITO), fluorine-doped tin oxide ($SnO_2$:F), or aluminum-doped zinc oxide (ZnO:Al). The functional layers preferably have a layer thickness of 8 nm to 25 nm, and particularly preferably of 13 nm to 19 nm. This is particularly advantageous with regard to transparency, color neutrality, and surface resistance of the electrically-conductive coating.

In an advantageous embodiment, the electrically-conductive coating is a layer or a layer structure of several individual layers with a total thickness of less than or equal to 2 μm, and particularly preferably less than or equal to 1 μm.

The total layer thickness of all electrically-conductive layers is preferably from 40 nm to 80 nm, and particularly preferably from 45 nm to 60 nm. In this range for the total thickness of all electrically-conductive layers, there is, advantageously, in the case of distances h between two busbars that are typical for vehicle panes—in particular, windshields—and an operating voltage U in the range of 12 V to 15 V, a sufficiently high specific heating power P. Moreover, the electrically-conductive coating in this region has particularly good reflective properties for the infrared range for the total thickness of all electrically-conductive layers. Too small total layer thicknesses of all electrically-conductive layers result in a too high a sheet resistance $R_{square}$ and thus in a too low specific heating power P and in reduced reflective properties for the infrared range.

In a very particularly preferred embodiment of the invention, the heating element is designed in the form of thin heating wires which are embedded at least in the opaque region of the masking layer. The advantage over the electrically-conductive coating lies in the simple production and arrangement of the heating wires compared to the electrically-conductive coating. The heating wires can, for example, be placed on a surface of a thermoplastic composite film prior to bonding the pane to form the laminated pane, said surface being provided for forming the opaque region of the masking layer of the laminated pane. During the manufacturing process of the laminated pane, the heating wires penetrate into the masking layer as a result of pressure and increased temperature. Depending upon the thickness of the heating wires used in each case, depressions can be cut into the masking layer by means of methods known to the person skilled in the art ("cutters"), into which the heating wires are arranged.

Alternatively, the heating wires can also be embedded in the thermoplastic intermediate layer, i.e., the opaque region of the masking layer, before the outer pane and the inner pane are connected—for example, by pressing in after heating of the thermoplastic film. The heating wires can also be positioned between two thermoplastic films during the production process of the laminated pane. The heating wires preferably contain at least one metal—particularly preferably copper, tungsten, gold, silver, aluminum, nickel, manganese, chromium, and/or iron, and mixtures and/or alloys thereof. The heating wires preferably have a thickness or a diameter of 10 μm to 300 μm, and particularly preferably of 20 μm to 150 μm. This is particularly advantageous with regard to the electrical conductivity of the heating wires and the heat distribution in the laminated pane. The heating wires may be coated with an electrically-insulating coating.

The heating wires are preferably arranged in a straight line within the opaque region of the masking layer. Alternatively, the heating wires can alternatively also be arranged, in regions or completely, in a sinusoidal, zig-zag-shaped, or meandering or coil-shaped manner—preferably in a meandering manner. Combinations of these arrangements are also possible. This means that the heating wires can run in a sinusoidal, zig-zag-shaped, or meandering or coil-shaped manner through the laminated pane when looking onto the laminated pane. This arrangement enables a good heat distribution in the laminated pane. In addition, the desired heating power of the heating wires can be set more precisely over the artificially extended distance between the busbars.

In a particular embodiment of the invention, a highly-refractive coating is applied to the entire inner side of the inner pane or to a region of the inner side of the inner pane. The highly-refractive coating is preferably in direct spatial contact with the inner side of the inner pane. In this case, the highly-refractive coating is arranged at least in one region on the inner side of the inner pane, which is in complete overlap with the reflective layer when looking through the laminated pane. The reflective layer is thus arranged spatially closer to the outer side of the outer pane, but spatially further away from the inner side of the inner pane, than the highly-refractive coating. This means that the light with preferably a majority proportion of p-polarized light, which is projected onto the reflective layer by the image display device, runs through the highly-refractive coating before it impinges upon the reflective layer.

The highly-refractive coating has a refractive index of at least 1.7, particularly preferably at least 1.9, and very particularly preferably at least 2.0. The increase in the refractive index results in a highly-refractive effect. The highly-refractive coating causes a weakening of the reflection of the light and in particular of p-polarized light on the interior-side surface of the inner pane, so that the desired reflection of the reflection coating shows a greater contrast.

According to an explanation of the inventors, the effect is based upon the increase in the refractive index of the surface on the interior side as a result of the highly-refractive coating. The Brewster angle $\alpha_{Brewster}$ is thereby increased at the interface, since said angle is known to be determined as $\alpha_{Brewster}=\arctan(n_2/n_1)$, where $n_1$ is the refractive index of air, and $n_2$ is the refractive index of the material upon which the radiation impinges. The highly-refractive coating with the high refractive index leads to an increase in the effective refractive index of the glass surface and thus to a displacement of the Brewster angle towards larger values compared to an uncoated glass surface. As a result, the difference between the angle of incidence and the Brewster angle becomes smaller in the case of conventional geometric relations of projection arrangements based upon HUD technology, so that the reflection of the p-polarized light on the inner side of the inner pane is suppressed, and the ghost image produced thereby is weakened.

The highly-refractive coating is preferably formed from a single layer and has no further layers below or above this layer. A single layer is sufficient to achieve a good effect and is technically easier than applying a layer stack. In principle, however, the highly-refractive coating can also comprise several individual layers, which may be desired for optimizing certain parameters in individual cases.

In the context of the present invention, refractive indices are preferably specified relative to a wavelength of 550 nm. Methods for determining refractive indices are known to the person skilled in the art. The refractive indices specified within the scope of the invention can be determined, for example, by ellipsometry, wherein commercially available ellipsometers can be used (measuring device made by, for example, Sentech). Unless otherwise indicated, the specification of layer thicknesses or thicknesses refers to the geometric thickness of a layer.

Suitable materials for a highly-refractive coating are silicon nitride ($Si_3N_4$), a silicon-metal mixed nitride (for example, silicon zirconium nitride (SiZrN), silicon-aluminum mixed nitride, silicon-hafnium mixed nitride, or silicon-titanium mixed nitride), aluminum nitride, tin oxide, manganese oxide, tungsten oxide, niobium oxide, bismuth oxide, titanium oxide, tin-zinc mixed oxide, and zirconium oxide. Furthermore, transition metal oxides (such as scandium oxide, yttrium oxide, tantalum oxide) or lanthanide oxides (such as lanthanum oxide or cerium oxide) can also be used. The highly-refractive coating preferably contains one or more of these materials or is formed on the basis thereof.

The highly-refractive coating can be applied by physical or chemical vapor deposition, i.e., a PVD or CVD coating. Suitable materials, on the basis of which the coating is preferably formed, are, in particular, silicon nitride, a silicon-metal mixed nitride (for example, silicon zirconium nitride, silicon-aluminum mixed nitride, silicon-hafnium mixed nitride, or silicon-titanium mixed nitride), aluminum nitride, tin oxide, manganese oxide, tungsten oxide, niobium oxide, bismuth oxide, titanium oxide, zirconium oxide, zirconium nitride, or tin-zinc mixed oxide. Preferably, the highly-refractive coating is a coating applied by cathode sputtering, and in particular a coating applied by magnetic-field-assisted cathode sputtering ("magnetron sputtering").

Alternatively, the highly-refractive coating is a sol-gel coating. In the sol-gel method, a sol which contains the precursors of the coating is first provided and matured. Maturing may include hydrolysis of the precursors and/or a (partial) reaction between the precursors. The precursors are usually present in a solvent—preferably water, alcohol (in particular, ethanol), or a water-alcohol mixture. The sol preferably contains silicon oxide precursors in a solvent. The precursors are preferably silanes, and in particular tetraethoxy silanes or methyltriethoxysilane (MTEOS). Alternatively, however, silicates can also be used as precursors, and in particular sodium, lithium, or potassium silicates, e.g., tetramethyl orthosilicate, tetraethyl orthosilicate (TEOS), tetraisopropyl orthosilicate, or organosilanes of the general form R2nSi(OR1)4-n, with R1 preferably being an alkyl group, R2 an alkyl, epoxy, acrylate, methacrylate, amin, phenyl, or vinyl group, and n an integer from 0 to 2. It is also possible to use silicon halides or alkoxides. The silicon oxide precursors lead to a sol-gel coating made of silicon oxide. To increase the refractive index of the coating to the value, additives that increase the breaking index are added to the sol—preferably titanium oxide and/or zirconium oxide, or precursors thereof. In the finished coating, the additives that increase the refractive index are present in a silicon oxide matrix. The molar ratio of silicon oxide to additives that increase the refractive index can be freely selected as a function of the desired refractive index and is, for example, 1:1.

If the reflective layer or the further reflective layer is arranged on the inner side of the inner pane, the highly-refractive coating can also be applied to the reflective layer or to the further reflective layer. This arrangement is suitable in particular if the reflective layer is arranged on the outer side of the inner pane, and the further reflective layer is arranged on the inner side of the inner pane. The highly-refractive coating improves the total reflection of light which impinges upon the reflective layer and the further reflective layer.

The outer pane and inner pane preferably comprise or consist of glass—particularly preferably flat glass, float glass, quartz glass, borosilicate glass, soda lime glass, alumino silicate glass—or clear plastics—preferably rigid clear plastics, and in particular polyethylene, polypropylene, polycarbonate, polymethyl methacrylate, polystyrene, polyamide, polyester, polyvinyl chloride, and/or mixtures thereof.

The outer pane and the inner pane can have further suitable coatings known per se, e.g., anti-reflective coatings, non-stick coatings, anti-scratch coatings, photocatalytic coatings or sun protection coatings, or low-e coatings.

The thickness of the individual panes (outer pane and inner pane) can vary widely and be adapted to the requirements of the individual case. Preferably, panes with the standard thicknesses of 0.5 mm to 5 mm and preferably of 1.0 mm to 2.5 mm are used. The size of the panes can vary widely and depends upon the use.

The laminated pane can have any three-dimensional shape. Preferably, the outer pane and the inner pane do not have any shadow zones, so that they can be coated, for example, by cathode sputtering. The outer pane and the inner pane are preferably flat or slightly or strongly curved in one direction or in several directions of the space.

The invention further extends to a projection arrangement which comprises a laminated pane according to the invention and an image display device assigned to the reflective layer. The image display device comprises an image display directed onto the reflective layer, the image of which display can be reflected by the reflective layer and, after reflection, preferably leaves the laminated pane according to the invention via the inner side of the inner pane, wherein at least the region of the reflective layer which is in overlap with the opaque region of the masking layer can be irradiated by the image display device. A corresponding number of image display devices can be provided if several reflective layers are arranged offset from one another in their extension.

The light emanating from the image display device is preferably visible light, i.e., light in a wavelength range of approximately 380 nm to 780 nm.

According to a preferred embodiment of the projection arrangement according to the invention, the image display can be designed as a liquid crystal display (LCD), thin film transistor (TFT) display, light-emitting diode (LED) display, organic light-emitting diode (OLED) display, electroluminescent (EL) display, microLED display, a display based upon light field technology or the like—preferably as an LCD display. Due to the high reflection of p-polarized light, energy-intensive projectors, as are usually used in head-up display applications, are not necessary. The aforementioned display variants and other similarly energy-saving display devices are sufficient. This has the consequence that the energy consumption and heat emission can be reduced.

In a preferred embodiment of the invention, the light of the display device is at least 80% and preferably at least 90% p-polarized. Alternatively, the light of the display device can be at least 80% and preferably at least 90% s-polarized.

Furthermore, the invention extends to a method for producing a laminated pane according to the invention. The method comprises the following method steps in the order specified:

(a) The outer pane, the thermoplastic intermediate layer, the heating element, the reflective layer, and the inner pane are arranged to form a layer stack.

The thermoplastic intermediate layer is arranged between the outer pane and the inner pane, and the heating element is arranged within the opaque region of the masking layer.

The reflective layer is arranged spatially in front of the masking layer in the viewing direction from the inner pane to the outer pane and overlaps at least partially with the opaque region of the masking layer.

(b) The layer stack is laminated to form a laminated pane.

Lamination of the layer stack takes place under the action of heat, vacuum, and/or pressure, wherein the individual layers are bonded (laminated) by at least one thermoplastic intermediate layer. Methods known per se for producing a laminated pane can be used. For example, so-called autoclave processes can be carried out at an elevated pressure of about 10 bar to 15 bar and temperatures of 130° C. to 145° C. over about 2 hours. Vacuum bag or vacuum ring methods known per se operate, for example, at approximately 200 mbar and 130° C. to 145° C. The outer pane, the inner pane, and the thermoplastic intermediate layer can also be pressed into a laminated pane in a calender between at least one roller pair. Systems of this type for the production of laminated panes are known and usually have at least one heating tunnel upstream of a pressing unit. The temperature during pressing is, for example, from 40° C. to 150° C. Combinations of calender and autoclave methods have proven particularly successful in practice. Vacuum laminators can be used as an alternative. They consist of one or more heatable and evacuable chambers, in which the outer pane and the inner pane can be laminated within, for example, approximately 60 minutes at reduced pressures of 0.01 mbar to 800 mbar and temperatures of 80° C. to 170° C.

The invention furthermore extends to the use of the laminated pane according to the invention in means of transportation for traffic on land, in the air, or on water—in particular, in motor vehicles—wherein the laminated pane can be used, for example, as a windshield, rear pane, side pane, and/or glass roof, and preferably as a windshield. The use of the laminated pane as a vehicle windshield is preferred. The laminated pane according to the invention can also be used as a functional and/or decorative individual piece and as a component in furniture, devices, and buildings.

The invention further extends to the use of the projection arrangement according to the invention, which comprises a laminated pane according to the invention and an image display device assigned to the reflective layer. The display device comprises an image display directed onto the reflective layer, the image of which display is reflected by the reflective layer and then preferably leaves the laminated pane according to the invention via the inner side of the inner pane, wherein at least the region of the reflective layer which is in overlap with the opaque region of the masking layer is irradiated by the display device.

The various embodiments of the invention can be implemented individually or in any combination. In particular, the features mentioned above and to be explained below can be used not only in the specified combinations, but also in other combinations or alone, without departing from the scope of the present invention.

Figure 1A:
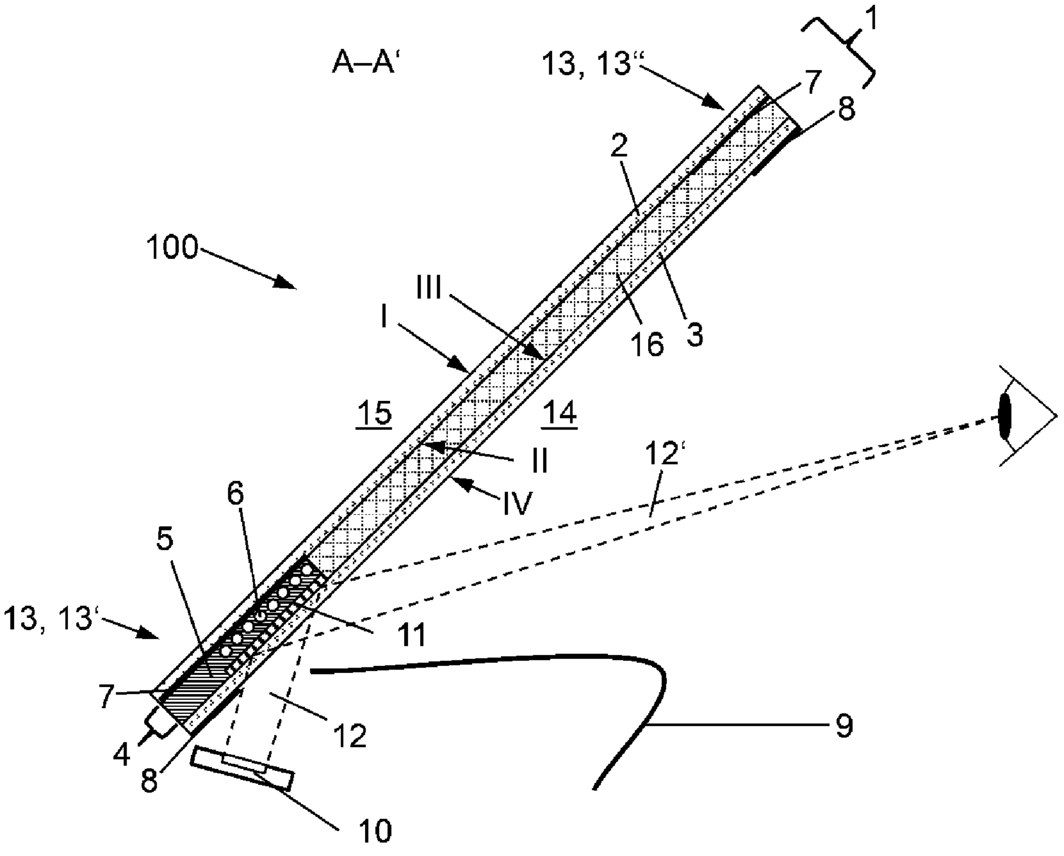
Figure 2:
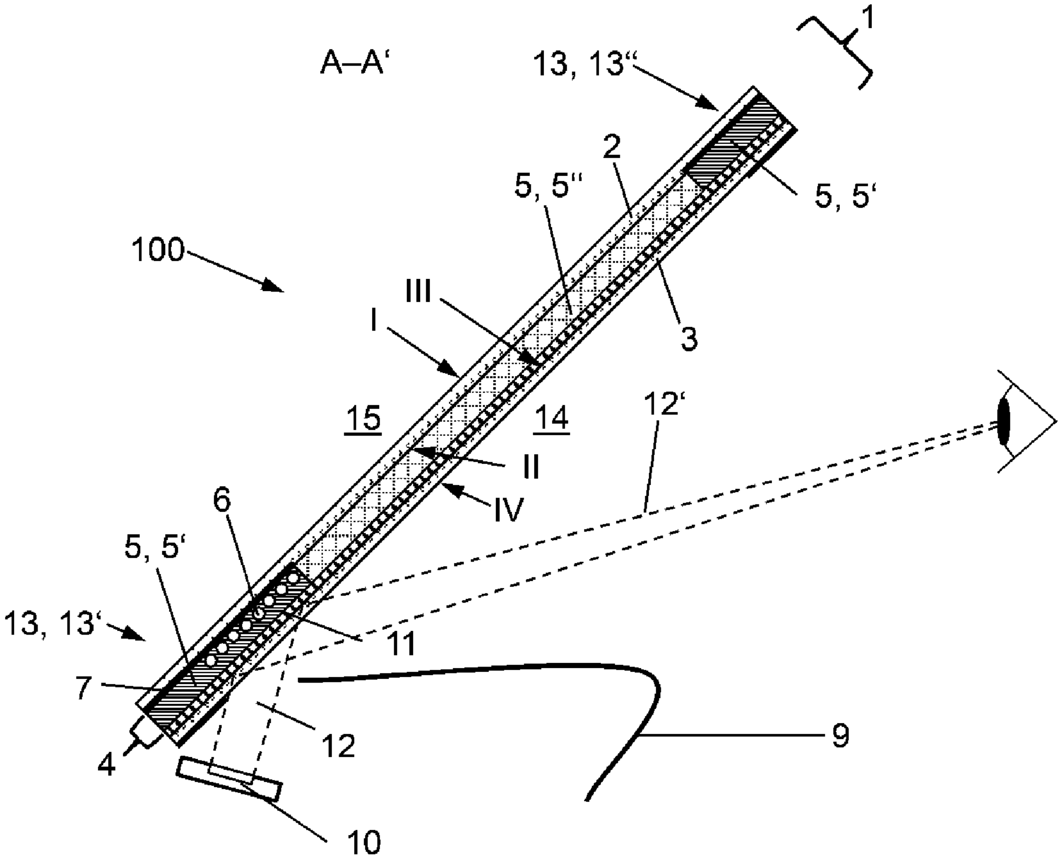

The invention is explained in more detail below with reference to exemplary embodiments, wherein reference is made to the accompanying figures. In a simplified, not-to-scale representation:

FIG. 1 shows a plan view of an embodiment of the laminated pane according to the invention;

FIG. 1*a* shows a cross-sectional view of a projection arrangement according to the invention with the laminated pane of FIG. 1;

FIG. 2 shows a further cross-sectional view of a projection arrangement according to the invention with a further embodiment of the laminated pane according to the invention; and FIGS. 3-6 show enlarged cross-sectional views of various embodiments of the projection arrangement according to the invention.

FIG. 1 shows a plan view of an embodiment of the laminated pane 1 according to the invention in a vehicle in a highly simplified, schematic representation. FIG. 1*a* shows a cross-sectional view of the exemplary embodiment from FIG. 1 in projection arrangement 100. The cross-sectional view of FIG. 1*a* corresponds to intersection line A-A' of the laminated pane 1, as indicated in FIG. 1.

The laminated pane 1 comprises an outer pane 2 and an inner pane 3 with a thermoplastic intermediate layer 4, which is arranged between the outer and inner panes 2, 3. The laminated pane 1 is installed in a vehicle and separates a vehicle interior 14 from an external environment 15. The laminated pane 1 is, for example, the windshield of a motor vehicle.

The outer pane 2 and the inner pane 3 each consist of glass—preferably thermally pre-stressed soda-lime glass—and are transparent to visible light. The thermoplastic intermediate layer 4 contains a masking layer 5 and a transparent layer 16.

The outer side I of the outer pane 2 faces away from the thermoplastic intermediate layer 4 and is, at the same time, the outer surface of the laminated pane 1. The inner side II of the outer pane 2 and the outer side III of the inner pane 3 each face the intermediate layer 4. The inner side IV of the inner pane 3 faces away from the thermoplastic intermediate layer 4 and is, at the same time, the inner side of the laminated pane 1. It is understood that the laminated pane 1 can have any suitable geometric shape and/or curvature. As a laminated pane 1, it typically has a convex curvature. The laminated pane 1 moreover has an upper edge located at the top in the installed position and a lower edge located at the bottom in the installed position, as well as a side edge located on the left and right.

A frame-like, circumferential first masking strip 7 is applied on the inner side II of the outer pane 2 in an edge region 13 of the laminated pane 1. The first masking strip 7 is opaque and obstructs the view of structures arranged on the inside of the laminated pane 1—for example, an adhesive bead for gluing the laminated pane 1 into a vehicle body. The first masking strip 7 is preferably black. The first masking strip 7 consists of a non-electrically-conductive material traditionally used for masking strips—for example, a black-colored screen-printing ink which is burnt in. The first masking strip 7 is arranged such that the masking layer 5 completely overlaps with the first masking strip. This means that, when looking through the laminated pane 1 from the external environment 15, it covers the masking layer 5 and all further structures located behind it.

Furthermore, as shown in FIG. 1A, the laminated pane 1 has a second masking strip 8 in the edge region 13 on the inner side IV of the inner pane 3. The second masking strip 8 is formed in a frame-like, circumferential manner. Like the first masking strip 7, the second masking strip 8 consists of a non-electrically-conductive material traditionally used for masking strips—for example, a black-colored screen-printing ink which is burnt in.

The transparent layer 16 consists of a thermoplastic plastic composite film—preferably polyvinyl butyral (PVB), ethylene vinyl acetate (EVA), and/or thermoplastic polyurethane (TPU). The transparent layer 16 extends from the upper edge region 13, 13" (beginning with the upper edge) flat along the upper edge and the side edges over the largest region (for example, 85% of the surface) of the inner side II of the outer pane 2 and the outer side III of the inner pane 3. The see-through region of the laminated pane 1 is in overlap with the transparent layer 16. The transparent layer 16 borders a masking layer 5 in the lower region. The masking layer 5 consists of an opaque, thermoplastic, plastic-composite film—preferably polyvinyl butyral (PVB), ethylene vinyl acetate (EVA), and/or thermoplastic polyurethane (TPU). The masking layer 5 is colored black, for example. The masking layer 5 extends flat along the lower edge (in edge region 13, 13') of the laminated pane 1 and along the side edges until it adjoins the transparent layer 16. The transparent layer 16 and the masking layer 5 may overlap slightly (for example, 5 mm) along the region where they adjoin.

A reflective layer 11, which is vapor-deposited by means of the PVD method, is arranged in regions on the outer side III of the inner pane 3. When looking through the laminated pane 1 from the external environment 15, the reflective layer 11 is completely overlapped by the masking layer 5. The reflective layer 11 is thus not visible from the external environment 15. In FIG. 1, the region in which the reflective layer 11 is arranged is indicated by dashed lines. The reflective layer 11 is arranged such that it is not covered by the second masking strip 8 when looking through the laminated pane 1 from the vehicle interior 14. In the example shown, the reflective layer 11 is arranged in a strip-like manner along the lower edge such that it completely overlaps with the masking layer 5 but is not covered by the second masking strip 8. The reflective layer 11 is, for example, a metal coating which contains at least one thin-film stack with at least one silver layer and a dielectric layer. Alternatively, the reflective layer 11 can also be designed as a reflective film and be arranged on the outer side III of the inner pane 3. The reflective film can contain a metal coating or can consist of dielectric polymer layers in a layer sequence.

The laminated pane 1 moreover comprises a heating element 6 arranged within the masking layer 5. The heating element 2 has been arranged, for example, during the production process between the outer pane 2 and the masking layer 5. The heating element 6 has been enclosed by the masking layer 5 through pressure and heating during lamination, so that the heating element 6 in the exemplary embodiment shown is arranged closer to the inner surface II of the outer pane 2 than to the outer surface III of the inner pane 3. The heating element 6 is designed in the form of heating wires, for example. The heating wires are formed, for example, on the basis of copper. The diameter of the heating wires 6 is, for example, approximately 100 μm. When looking through the laminated pane 1 from the vehicle interior 14, the heating element 6 is arranged behind the reflective layer 11 and is largely covered by the latter. The heating element 6 extends approximately orthogonally to the side edges and along the lower edge. The heating element 6 is not visible from the external environment 15 or from the vehicle interior 14, since it is completely covered by the first masking strip 7 and by the masking layer 5.

The heating element 6 is materially and electrically connected to a first busbar in a left edge region of the heating element and to a further, second busbar in a right edge region of the heating element (not visible in FIG. 1 and FIG. 1*a*) for making electrical contact. The busbars contain silver particles, for example, and have been applied by screen printing and subsequently burnt in. The length of the busbars corresponds approximately to the extension of the heating element 6 along the side edges of the laminated pane 1. If an electrical voltage is applied to the busbars, a uniform current flows through the heating element 6 between the busbars. The busbars are connected by means of supply lines to a voltage source which provides an on-board voltage customary for motor vehicles—preferably 12 V to 15 V, and, for example, about 14 V. Alternatively, the 14 V voltage source can also have higher voltages—for example, from 35 V to 45 V, and in particular 42 V. If a current flows through the heating element 6, the heating wires are heated as a result of their electrical resistance and Joule heat generation. The region of the laminated pane 1 in which the heating element 6 is arranged can thus be freed quickly and efficiently from icing and fogging.

The projection arrangement 100 furthermore comprises a display device 10 arranged in the dashboard 9 as an image generator. The display device 10 is used to generate light 12 (image information) which is directed onto the reflective layer 11 and is reflected by the reflective layer 11 as reflected light 12' into the vehicle interior 14, where it can be seen by a viewer, e.g., a driver. The reflective layer 11 is suitably designed to reflect the light 12 of the display device 10, i.e., an image of the display device 10. The light 12 of the display device 10 preferably impinges upon the laminated pane 1 at an angle of incidence of 50° to 80°—in particular, 60° to 70°, and, typically, approximately 65°—as is customary for HUD projection arrangements. It would also be possible, for example, to arrange the display device 10 in the A-pillar of a motor vehicle or on the roof (in each case inside the vehicle) if the reflective layer 11 is suitably positioned for this purpose. If several reflective layers 11 are provided, a separate display device 10 can be assigned to each reflective layer 11, i.e., several display devices 10 can be arranged. The display device 10 is, for example, a display such as an LCD display, OLED display, EL display, or μLED display. It would also be possible, for example, for the laminated pane 1 to be a roof panel, side pane, or rear pane.

The variant shown in FIG. 2 corresponds substantially to the variant from FIGS. 1 and 1*a*, so that only the differences will be discussed here, and reference is otherwise made to the description relating to FIGS. 1 and 1*a.*

Unlike in FIGS. 1 and 1*a*, the reflective layer 11 in FIG. 2 extends over the entire surface of the outer side III of the inner pane 3 and is applied thereto. Unlike as shown here, however, it is also possible for the reflective layer 11 to be applied to the inner side IV of the inner pane 3. The reflective layer 11 is, for example, a metal coating which contains at least one thin-film stack with at least one silver layer and a dielectric layer. The reflective layer 11 is partially transparent to light, so that the reflective layer 11 reflects approximately 30% of the light 12 impinging upon it and shows a transmission for the light 12 of approximately 70%.

In this exemplary embodiment, the thermoplastic intermediate layer 4 consists solely of the masking layer 5, which, in contrast to FIGS. 1 and 1*a*, is arranged not only in an edge region 13' of the laminated pane 1 between the outer pane 2 and the inner pane 3, but is arranged congruently on the entire inner side II of the outer pane 2 and the outer side III of the inner pane 3. The masking layer 5 has a transparent region 5" and an opaque region 5'. It is, prior to the lamination, a coherent composite film, which is formed, for example, on the basis of polyvinyl butyral (PVB), ethylene vinyl acetate (EVA), and/or thermoplastic polyurethane (TPU), but is colored in a frame-shaped circumferential region 5' of the masking layer 5. The coloring is black, for example. However, the region 5" of the masking layer 5 within the frame-shaped circumferential section 5' is transparent, and can thus be seen through. The thickness of the masking layer 5 is, for example, 0.76 mm. When looking through the laminated pane 1, the first masking strip 7 is applied to be congruent with the opaque region 5' of the masking layer 5 on the inner surface II of the inner pane.

The opaque region 5' of the masking layer 5 is widened in the lower (motor-side) section 13' of the edge region 13, i.e., the opaque region 5' has a greater width in the lower (motor-side) section 13' of the edge region 13 than in the upper (roof-side) section 13" of the edge region 13 (as in the lateral sections of the edge region 13, which cannot be seen in FIG. 2) of the laminated pane 1. “Width” is understood to mean the dimension of the opaque region 5' perpendicular to the lower edge of the inner and outer panes 2, 3.

In this exemplary embodiment, the heating element 6 could likewise be arranged in the upper roof-side section 13' within the opaque region 5' of the masking layer 5. In addition, in order to achieve a circumferential heating effect, the heating element 6 could also be arranged along the extension direction from the upper edge to the lower edge and in the side edge region.

Furthermore, several display devices 10 could be provided which irradiate, for example, the lower (motor-side) section 13' and the upper (roof-side) section 13" of the edge region 13 with visible light 12. For example, the display device 10 could be arranged such that a (partially) circumferential image is generated.

Because the reflective layer 11 extends over the entire outer side III of the inner pane 3, all regions of the laminated pane 1 can be used to reflect an image. It is possible to use further display devices which irradiate, for example, regions of the reflective layer 11 which are not overlapping with the opaque region 5' of the masking layer 5, i.e., are located, for example, in the see-through region of the laminated pane 1. Through this, the function of a head-up display can be used.

Reference is now made to FIGS. 3 through 6, in which enlarged cross-sectional views of various embodiments of the laminated pane 1 are shown. The cross-sectional views of FIGS. 3 through 6 correspond to intersection line A-A' in the lower section 13' of the edge region 13 of the laminated pane 1, as indicated in FIG. 1*a*.

Figure 3:
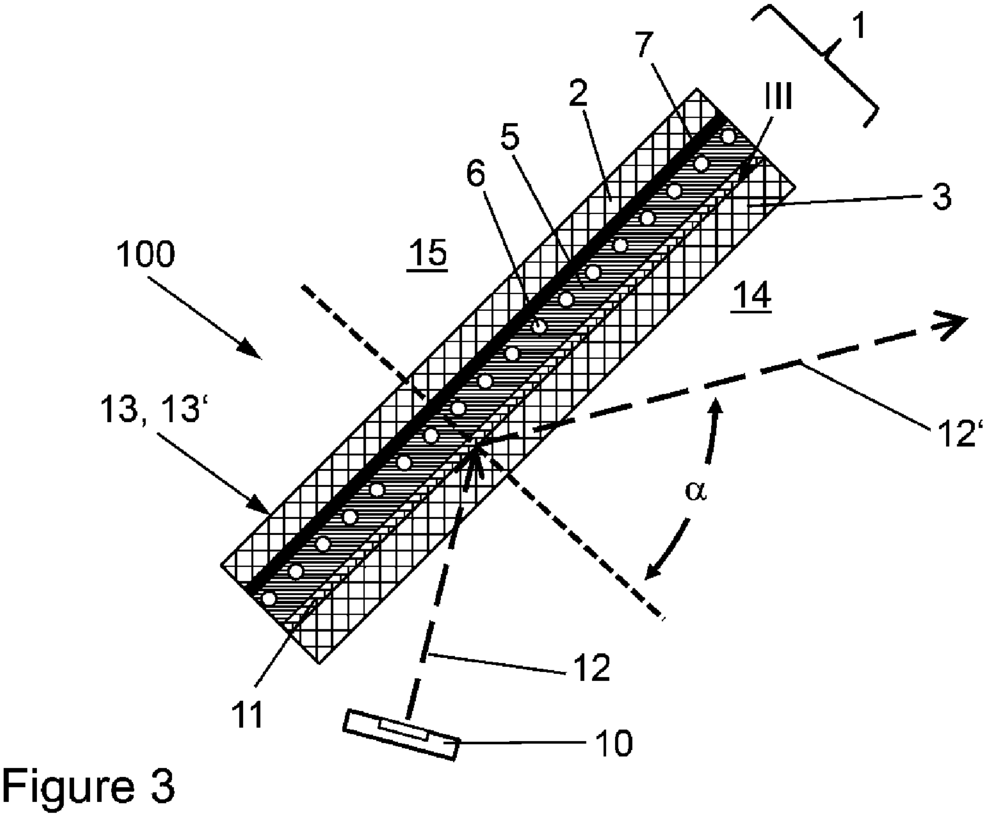

FIG. 3 shows an enlarged cross-sectional view in the edge region 13' of FIG. 1*a*. In the variant of the laminated pane 1 shown in FIG. 3, the completely opaque masking layer 5 is arranged between the outer pane 2 and the inner pane 3. In the example shown, the masking layer 5 is in direct material contact with the reflective layer 11 and the first masking strip 7. The reflective layer 11 is arranged on the outer side III of the inner pane 3. The light 12 from the display device 10 is reflected by the reflective layer 11 as reflected light 12' into the vehicle interior 14. The light 12, 12' can have an s- and/or p-polarization. Due to the angle of incidence of the light 12 on the laminated pane 1 near the Brewster angle, the p-polarized proportion of the light 12 is barely prevented from transmission through the inner pane 3. This variant has the advantage that a relatively large proportion of the incident p-polarized light 12 is reflected and subsequently, due to the fact that the angle of incidence equals the angle of reflection (indicated by a in FIGS. 3 through 6), can, largely unimpeded, pass through the inner pane 3 and into the vehicle interior 14. In addition, the image is clearly visible against the background of the opaque masking layer 5 with high contrast. Because of the first masking strip 7, the heating element 5 cannot be seen from the external environment 15. Also, due to the opaque masking layer 5, the heating element cannot be seen from the vehicle interior 14.

The heating wires of the heating element 6 are arranged with their extension direction orthogonally to the cross-sectional plane within the opaque masking layer 5. The individual heating wires are arranged at a distance of, for example, approximately 1 mm from one another from the lower to the upper sections of the enlarged cross-section.

The variants shown in FIGS. 4 through 6 correspond substantially to the variant from FIGS. 1, 1*a*, and 3, so that only the differences will be discussed here, and reference is otherwise made to the description relating to FIGS. 1, 1*a*, and 3.

Figure 4:
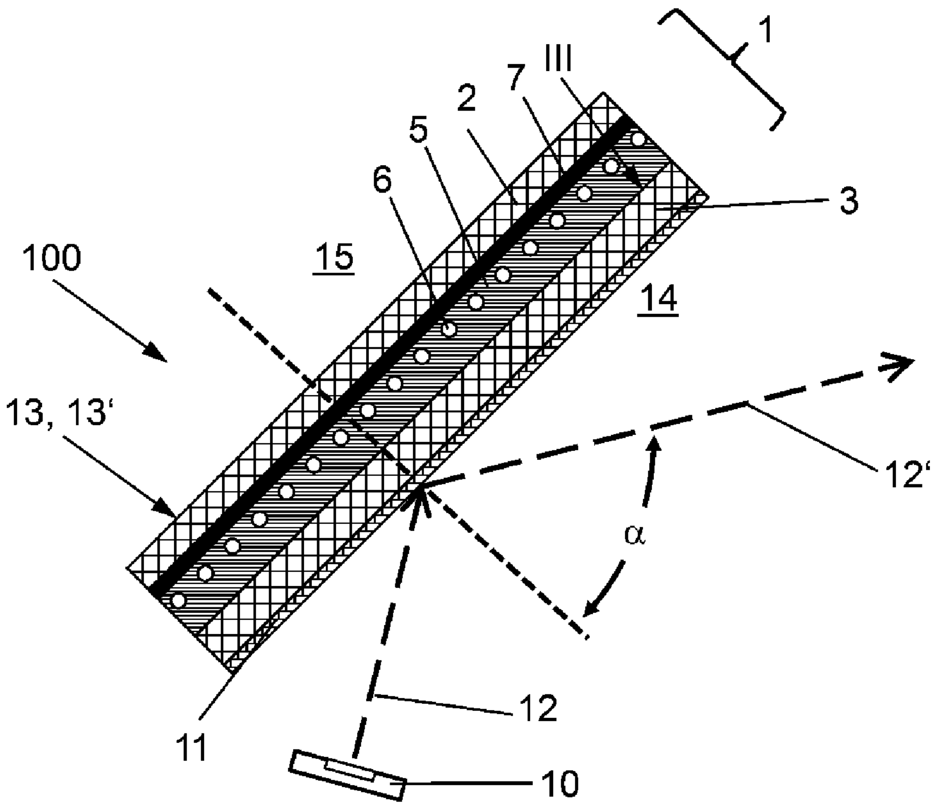

Unlike as shown in FIG. 3, the reflective layer 11 in FIG. 4 is applied, not on the outer side III of the inner pane 3, but on the inner side IV of the inner pane 3. This variant has the advantage that the incident light 12 is not prevented by the transmission through the inner pane 3. It is also preferred for light 12 having a high proportion of s-polarized light, because it results in fewer double images caused by the reflection on the inner pane 3.

Figure 5:
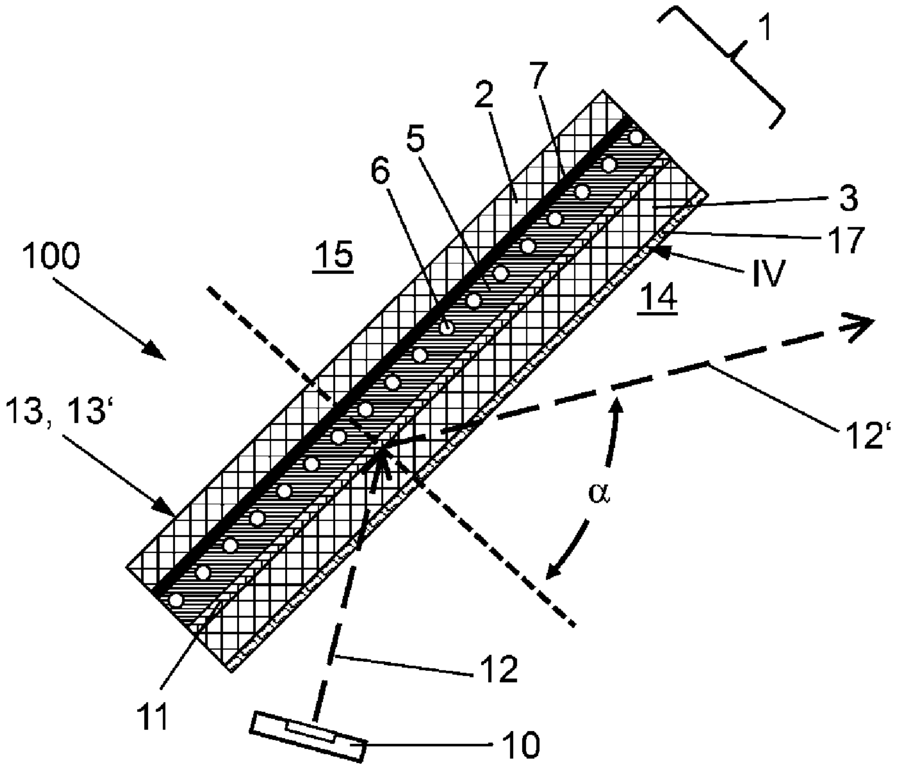

The variant of the laminated pane 1 shown in FIG. 5 differs from the variant of FIG. 3 only in that a highly-refractive coating 17 is arranged on the inner side IV of the inner pane 3. The highly-refractive coating 17 is applied, for example, by means of the sol-gel method and consists of a titanium oxide coating. Due to the higher refractive index (for example, 1.7) of the highly-refractive coating 17 compared to the inner pane 3, the Brewster angle, which is normally approximately 56.5° (for soda lime glass), can be changed, which simplifies the application and reduces the effect of disruptive double images caused by the reflection on the inner side IV of the inner pane 3.

Figure 6:
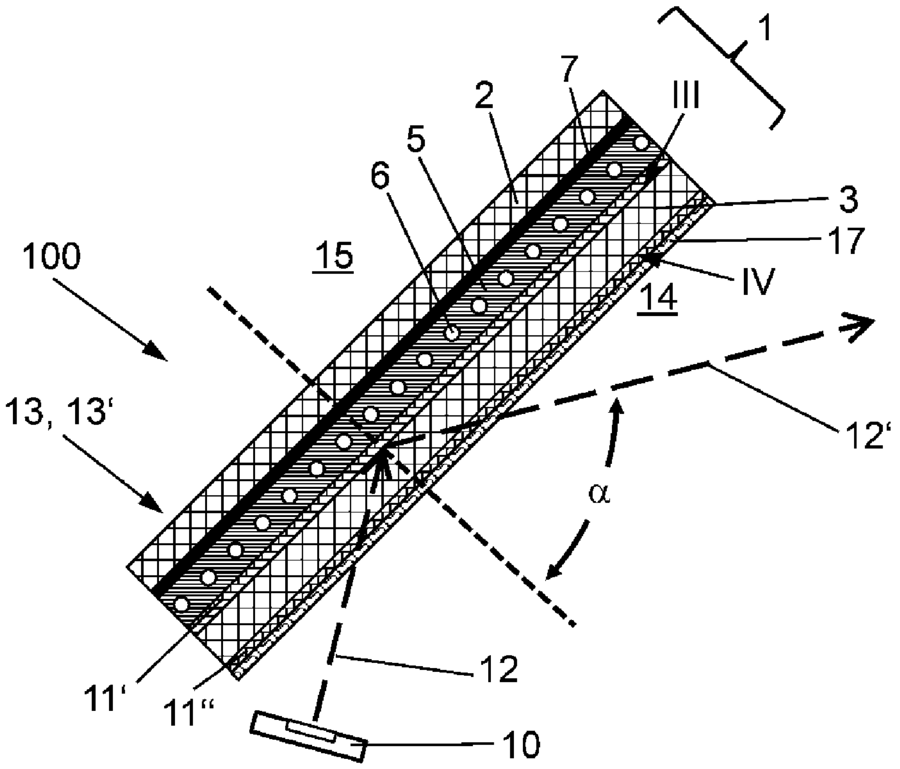

The variant of the laminated pane 1 shown in FIG. 6 differs from the variant of FIG. 3 in that, in addition to the first reflective layer 11' on the outer side III of the inner pane 3, a further reflective layer 11" is arranged on the inner side IV of the inner pane 3. Moreover, the highly-refractive coating 17 is applied to the further reflective layer 11". This arrangement then offers great advantages if the reflective layers 11', 11" each reflect smaller proportions (<10%) of the incident light 12. The arrangement on both the outer side III and the inner side IV of the inner pane 3 improves the total reflection of the incident light 12. The highly-refractive coating 17 moreover contributes to avoiding disruptive double images caused by the reflection on the inner side IV of the inner pane 3.

In all exemplary embodiments, the reflective layer 11 is arranged on the vehicle interior side of the masking layer 5, i.e., the reflective layer 11 is located in front of the masking layer 5 when looking onto the inside of the laminated pane 1.

It results from the above embodiments that the invention provides an improved laminated pane for a projection arrangement, which enables a good image representation with high contrast. Undesired secondary images can be avoided. Due to the use of the heating element together with the laminated pane, the space in the dashboard region can be significantly reduced when installed in a vehicle, which can enable a leaner design in the vehicle interior. With the image presentation via the reflective layer in front of the masking layer, the display, which is usually attached to the dashboard, with speedometer, tachometer, warning indicator, and fuel gauge can be replaced. Heating of the laminated pane by the heating element replaces supply lines, which usually conduct air heated by engine heat to the windshield. Moreover, additional geometric degrees of freedom arise when designing the vehicle interior if the air outlet nozzles, which are usually mounted in a specific geometric relationship to the glazing, are omitted. The laminated pane according to the invention can be produced easily and cost-effectively using known production methods.

LIST OF REFERENCE SIGNS

1 Laminated pane
2 Outer pane
3 Inner pane
4 Thermoplastic intermediate layer
5 Masking layer
5' Opaque region
5" Transparent region
6 Heating element
7 First masking strip
8 Second masking strip
9 Dashboard
10 Display device
11 Reflective layer
12, 12' Light
13, 13', 13" Edge region
14 Vehicle interior
15 External environment
16 Transparent layer
17 Highly-refractive coating
100 Projection arrangement
I Outer side of the outer pane 2
II Inner side of the outer pane 2
III Outer side of the inner pane 3
IV Inner side of the inner pane 3
A-A' Intersection line

The invention claimed is:

1. A laminated pane, comprising:

an outer pane, an inner pane, and a thermoplastic intermediate layer arranged between the outer pane and the inner pane, wherein the outer pane and the inner pane each have an outer side and an inner side, and the inner side of the outer pane and the outer side of the inner pane face one another, and the thermoplastic intermediate layer comprises at least one masking layer comprising one or more thermoplastic films, wherein at least one of the one or more thermoplastic films is colored or pigmented so as to be opaque at least in one region, the opaque region having a light transmittance of less than 15%, a heating element which is completely enclosed by the opaque region of the at least one masking layer, and a reflective layer adapted to reflect visible light, wherein the reflective layer is arranged spatially in front of the at least one masking layer in the viewing direction from the inner pane to the outer pane and overlaps at least partially with the opaque region of the at least one masking layer.

2. The laminated pane according to claim 1, wherein the at least one masking layer further comprises a transparent region.

3. The laminated pane according to claim 2, wherein the opaque region extends over less than 30% of a total surface of the laminated pane.

4. The laminated pane according to claim 1, wherein the thermoplastic intermediate layer contains the at least one masking layer and a transparent layer, and the at least one masking layer is completely opaque.

5. The laminated pane according to claim 4, wherein the at least one masking layer extends over less than 30% of a total surface of the laminated pane.

6. The laminated pane according to claim 1, wherein the at least one masking layer is arranged to be at least adjacent to a lower edge of the laminated pane.

7. The laminated pane according to claim 6, wherein the at least one masking layer extends over at least 5% of a total surface of the laminated pane.

8. The laminated pane according to claim 1, wherein the opaque region of the at least one masking layer is arranged in a frame-like, circumferential manner in an edge region of the laminated pane and, in a section which is in overlap with the reflective layer, has a greater width than in sections different therefrom.

9. The laminated pane according to claim 1, further comprising a first masking strip which is applied in regions on the inner side of the outer pane, and wherein at least the heating element overlaps completely with the first masking strip.

10. The laminated pane according to claim 1, wherein the reflective layer has an average transmission in the visible spectral range of at least 60%, and/or the reflective layer reflects at least 15% of the light incident on the reflective layer.

11. The laminated pane according to claim 1, further comprising a first busbar and a second busbar, which are provided for connection to a voltage source, wherein the first and the second busbars are connected to an edge region of the heating element in such a way that a current path through the heating element for a heating current is formed between the first and second busbars.

12. The laminated pane according to claim 1, wherein the heating element is designed in the form of heating wires which have a diameter of 10 μm to 300 μm.

13. The laminated pane according to claim 12, wherein the heating wires contain or consist of a metal.

14. The laminated pane according to claim 1, wherein a highly-refractive coating with a refractive index of at least 1.7 is arranged at least in one region of the inner side of the inner pane, which region is in overlap with the reflective layer, and wherein the highly-refractive coating is always arranged spatially in front of the reflective layer when looking onto the inner side of the inner pane.

15. A method for producing a laminated pane according to claim 1, the method comprising:

(a) arranging the outer pane, the thermoplastic intermediate layer, the heating element, the reflective layer, and the inner pane to form a layer stack, wherein the thermoplastic intermediate layer is arranged between the outer pane and the inner pane, and the heating element is completely enclosed by the opaque region of the at least one masking layer, and wherein the reflective layer is arranged spatially in front of the at least one masking layer in the viewing direction from the inner pane to the outer pane and overlaps at least partially with the opaque region of the at least one masking layer, and (b) laminating the layer stack obtained to form a laminated pane.

16. A method comprising providing a laminated pane according to claim 1 in a vehicle for traffic on land, in the air, or on water.

17. The laminated pane according to claim 1, wherein the laminated pane is a laminated pane of a projection arrangement.

18. A laminated pane, comprising an outer pane, an inner pane, and a thermoplastic intermediate layer arranged between the outer pane and the inner pane, wherein the outer pane and the inner pane each have an outer side and an inner side, and the inner side of the outer pane and the outer side of the inner pane face one another, and the thermoplastic intermediate layer comprises at least one masking layer, and the at least one masking layer is opaque at least in one region, a heating element which is arranged within the opaque region of the at least one masking layer, and a reflective layer adapted to reflect visible light, wherein the reflective layer is arranged spatially in front of the at least one masking layer in the viewing direction from the inner pane to the outer pane and overlaps at least partially with the opaque region of the at least one masking layer, and wherein the reflective layer and the opaque region each have a surface, which are arranged congruently, or the opaque region has a larger surface than the reflective layer, and the reflective layer overlaps completely with the opaque region.

19. A laminated pane, comprising an outer pane, an inner pane, and a thermoplastic intermediate layer arranged between the outer pane and the inner pane, wherein the outer pane and the inner pane each have an outer side and an inner side, and the inner side of the outer pane and the outer side of the inner pane face one another, and the thermoplastic intermediate layer comprises at least one masking layer, and the at least one masking layer is opaque at least in one region, a heating element which is arranged within the opaque region of the at least one masking layer, and a reflective layer adapted to reflect visible light, wherein the reflective layer is arranged spatially in front of the at least one masking layer in the viewing direction from the inner pane to the outer pane and overlaps at least partially with the opaque region of the at least one masking layer, and wherein the heating element is completely embedded in the opaque region of the at least one masking layer.

20. A projection arrangement comprising:

a laminated pane comprising an outer pane, an inner pane, and a thermoplastic intermediate layer arranged between the outer pane and the inner pane, wherein the outer pane and the inner pane each have an outer side and an inner side, and the inner side of the outer pane and the outer side of the inner pane face one another, and the thermoplastic intermediate layer comprises at least one masking layer, and the at least one masking layer is opaque at least in one region, a heating element which is arranged within the opaque region of the at least one masking layer, and a reflective layer adapted to reflect visible light, wherein the reflective layer is arranged spatially in front of the at least one masking layer in the viewing direction from the inner pane to the outer pane and overlaps at least partially with the opaque region of the at least one masking layer, a display device assigned to the reflective layer and having an image display directed onto the reflective layer, the image of which image display is reflectable by the reflective layer, wherein at least the region of the reflective layer which is in overlap with the opaque region of the at least one masking layer can be irradiated by the display device.

* * * * *